United States Patent [19]

Anderson et al.

[11] Patent Number: 5,895,497

[45] Date of Patent: Apr. 20, 1999

[54] MICROPROCESSOR WITH PIPELINING, MEMORY SIZE EVALUATION, MICRO-OP CODE AND TAGS

[75] Inventors: Timothy D. Anderson; Steven D. Krueger, both of Dallas; Jonathan H. Shiell, Plano, all of Tex.

[73] Assignee: Texas Instruments Incorporated, Dallas, Tex., TX

[21] Appl. No.: 08/761,731

[22] Filed: Dec. 5, 1996

Related U.S. Application Data

[XX .
[60] Provisional application No.60/008,230, Dec. 6, 1995.

[51] Int. Cl.$^6$ ..................... G06F 12/00
[52] U.S. Cl. ..................... 711/169; 711/117
[58] Field of Search ..................... 395/386, 383, 395/557, 585; 711/169

[56] References Cited

U.S. PATENT DOCUMENTS

| | | | |
|---|---|---|---|
| 4,926,323 | 5/1990 | Baror et al. | 395/585 |
| 5,148,528 | 9/1992 | Fite et al. | 395/386 |
| 5,155,817 | 10/1992 | Kishigami et al. | 395/394 |
| 5,167,026 | 11/1992 | Murray et al. | 395/386 |
| 5,542,058 | 7/1996 | Brown, III et al. | 395/557 |
| 5,581,719 | 12/1996 | Stedy, Jr. et al. | 395/383 |
| 5,630,149 | 5/1997 | Bluhm | 395/393 |

*Primary Examiner*—Tod R. Swann
*Assistant Examiner*—David Langjahr
*Attorney, Agent, or Firm*—Rebecca Mapstone Lake; Richard L. Donaldson

[57] ABSTRACT

Circuits, systems and methods for operating a processor to process a plurality of sequentially arranged instructions. The method includes various steps, such as receiving (54) into a processor pipeline an instruction from the plurality of sequentially arranged instructions. Next, determines (56) whether the received instruction comprises a memory access instruction. A memory access instruction is operable to access memory information of a specifiable size. In response to determining that the received instruction comprises a memory access instruction, the method generates (58) at least one micro-operation code corresponding to the memory access instruction and it also sets (60) a tag to the at least one micro-operation code, where the set tag requests a subsequent evaluation of the specifiable size. After the tag is set, the method later detects (64, 72) the set tag and, in response to the set tag, retrieves (66, 74) a current value of the specifiable size.

42 Claims, 2 Drawing Sheets

MICROPROCESSOR WITH PIPELINING, MEMORY SIZE EVALUATION, MICRO-OP CODE AND TAGS

This application claims the benefit of provisional application Ser. No. 60/008,230 filed Dec. 6, 1995.

TECHNICAL FIELD OF THE INVENTION

This invention relates to microprocessors, and is more particularly directed to a microprocessor with improved memory access circuits, systems, and methods.

BACKGROUND OF THE INVENTION

Significant advances have recently been made in the design of microprocessors to improve their performance, as measured by the number of instructions executed over a given time period. One such advance is the recent introduction of microprocessors of the "superscalar" type, which accomplish parallel instruction computation with a single instruction pointer. Typically, superscalar microprocessors have multiple execution units, such as multiple integer arithmetic logic units (ALUs) and a floating point unit (FPU), for executing program instructions. As such, multiple machine instructions may be executed simultaneously in a superscalar microprocessor, providing obvious benefits in the overall performance of the device and its system application.

Another common technique used in modern microprocessors to improve performance involves the "pipelining" of instructions. As well known in the art, microprocessor instructions each generally involve several sequential operations, such as instruction fetch, instruction decode, retrieval of operands from registers or memory, execution of the instruction, and writeback of the results of the instruction. Pipelining of instructions in a microprocessor refers to the staging of a sequence of instructions so that multiple instructions in the sequence are simultaneously processed at different stages in the internal sequence. For example, if a pipelined microprocessor is executing instruction n in a given microprocessor clock cycle, a four-stage pipelined microprocessor may simultaneously (i.e., in the same machine cycle) retrieve the operands for instruction n+1 (i.e., the next instruction in the sequence), decode instruction n+2, and fetch instruction n+3. Through the use of pipelining, the performance of the microprocessor can effectively execute a sequence of instructions at a rate of one per clock cycle.

Although the use of both pipelining and superscalar techniques permit many modern microprocessors to execute instructions at a rate greater than one per machine clock cycle, many programs include aspects which cause operation to disrupt the program flow and, therefore, to depart from ideal operation and efficiency. One key example addressed by the embodiments below arises from memory access instructions having changeable operand sizes. These instructions either read operands from, or write operands to, a memory system, but the size of the operand may vary according to some specifiable parameter; for example, the operand may be specified at a given time as either a 16-bit or 32-bit operand. Typically, the specified access size is located in a so-called memory descriptor. The descriptor is often included in a segment register, such as a code segment register or a stack segment register. Each of these registers has a corresponding descriptor which includes various information about the corresponding portion of the memory system, including the size of an access of that memory system. For example, in the x86 architecture, the stack segment register ("SS register") includes a bit referred to as the B bit which, when set to a logic 0 indicates that a memory stack access is a 16-bit operand, while when set to a logic 1 indicates that a memory stack access is a 32-bit operand. Similarly, the x86 architecture includes a code segment register ("CS register") having a bit referred to as the D bit which generally, when set to a logic 0 indicates that a memory data access is a 16-bit operand, while when set to a logic 1 indicates that a memory data access is a 32-bit operand. As detailed below, however, the combination of variable size operands with superscalar and/or pipelined architectures raises a risk that a memory access instruction is misinformed of its corresponding access size.

One possibility for misinforming the memory access instruction of its operand size arises in a machine where instructions are executed from different execution units and out of the sequential order in which they appear in the original program. For example, assume a memory access instruction is followed sequentially in a program by a memory segment change instruction which changes the operand size in the memory descriptor. Assume further that the memory segment change instruction executes out of order and prior to the memory access instruction. In this instance, the memory access instruction is informed of the newly changed operand size from the memory segment change instruction, while it was intended based on the program sequence that the memory access instruction perform its memory access according to the descriptor size prior to the change in the memory descriptor. Consequently, the memory access instruction has accessed the memory in an erroneous fashion.

Another possibility for misinforming the memory access instruction of its operand size arises in a deep pipeline machine, even if instructions are executed in order. For example, certain machines may require that the memory access instruction is informed of its operand size at the decode stage of operation. In such an example, assume that a memory segment change instruction which changes the operand size in the memory descriptor is followed immediately by a memory access instruction, but that the memory segment change instruction does not accomplish its change until an execution stage which occurs three stages after the decode stage. In this example, and assuming no other corrective action, the memory access instruction will reach the decode stage before the memory segment change instruction is executed and, therefore, the memory access instruction will be informed at its decode stage of the current segment descriptor, that is, before the memory segment change instruction has had the chance to execute and correctly change the segment descriptor. Eventually, therefore, the memory access instruction will execute given a potential erroneous value of the segment descriptor and, therefore, an erroneous value of the operand size. Again, therefore, the memory access instruction has accessed the memory in an unacceptable fashion.

One prior art approach to avoid misinforming the memory access instruction of its operand size is to monitor instructions as they are decoded, and to "flush" or empty the pipeline upon detecting the occurrence of a memory segment change instruction which changes the value of subsequent operand sizes. For example, in the x86 architecture, the prior art approach detects an instruction such as the "LOAD SS" instruction which, as known in the art, may change the value of the contents of the SS register. In this event, the prior art compares the value of the B bit after the LOAD SS is executed with the value prior to that execution;

if the value of the B bit changes, then all instructions in the pipeline following the LOAD SS are flushed from the pipeline. Unfortunately, this flushing spends multiple machine clock cycles before the execution of the next instruction can occur, and the intervening clock cycles required to re-fill the pipeline appear as idle cycles from the viewpoint of completed instructions. The effect of this pipeline flushing is exacerbated in the case of superscalar pipelined microprocessors. Particularly, the number of lost pipeline slots, or lost execution opportunities, is multiplied by the number of parallel execution units (i.e., parallel pipelines).

In view of the above, there arises a need to substantially reduce or eliminate the risk of misinforming a memory access instruction of the size of its corresponding operand (s), and further to reduce the inefficiencies and drawbacks of the prior art.

SUMMARY OF THE INVENTION

In one embodiment, there is a method of operating a processor to process a plurality of sequentially arranged instructions. The method includes various steps, such as receiving into a processor pipeline an instruction from the plurality of sequentially arranged instructions. Next, the method determines whether the received instruction comprises a memory access instruction. A memory access instruction is one which is operable to access memory information of a specifiable size. In response to determining that the received instruction comprises a memory access instruction, the method generates at least one micro-operation code corresponding to the memory access instruction and sets a tag to the at least one micro-operation code, where the set tag requests a subsequent evaluation of the specifiable size. After the tag is set, the method later detects the set tag and, in response to the set tag, retrieves a current value of the specifiable size. Other circuits, systems, and methods are also disclosed and claimed.

DETAILED DESCRIPTION OF THE PREFERRED EMBODIMENTS

Figure 1:
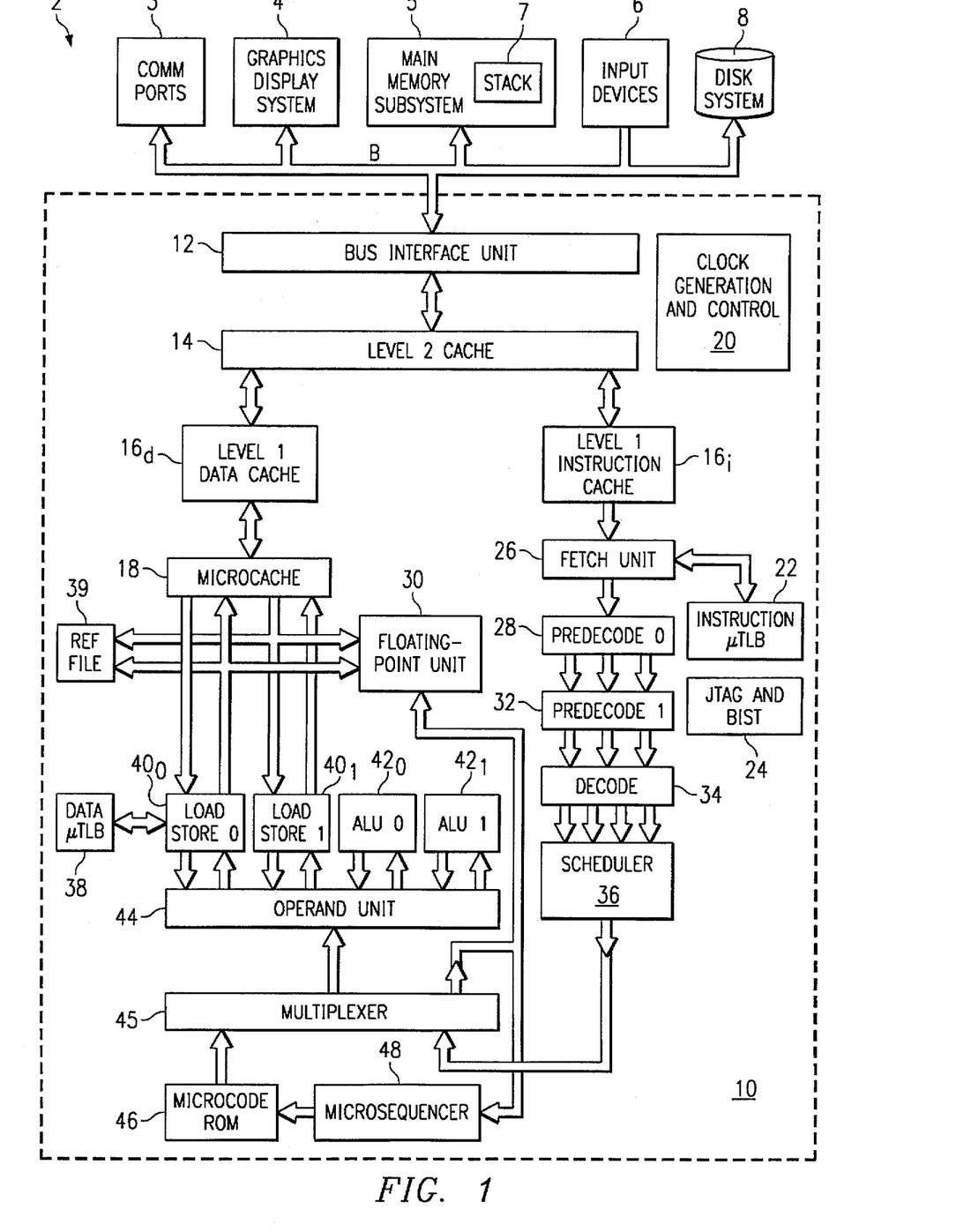
FIG. 1 illustrates an exemplary data processing system within which the preferred embodiment is implemented.

Referring to FIG. 1, an exemplary data processing system 2, including an exemplary superscalar pipelined microprocessor 10 within which the preferred embodiment is implemented, is described. The following discussion first overviews system 2, and given the understanding derived from that overview, then addresses the context of improving memory accesses within system 2. Note also that it is to be understood that the architecture of system 2 and of microprocessor 10 is described herein by way of example only, as it is contemplated that the present embodiments may be utilized in microprocessors of various architectures, with particular benefit to those of the superscalar type. It is therefore contemplated that one of ordinary skill in the art, having reference to this specification, will be readily able to implement the present embodiments in such other microprocessor architectures.

Microprocessor 10, as shown in FIG. 1, is connected to other system devices by way of bus B. While bus B, in this example, is shown as a single bus, it is of course contemplated that bus B may represent multiple buses having different speeds and protocols, as is known in conventional computers utilizing the PCI local bus architecture; single bus B is illustrated here merely by way of example and for its simplicity. System 2 contains such conventional subsystems as communication ports 3 (including modem ports and modems, network interfaces, and the like), graphics display system 4 (including video memory, video processors, a graphics monitor), main memory system 5 which is typically implemented by way of dynamic random access memory (DRAM), input devices 6 (including keyboard, a pointing device, and the interface circuitry therefor), and disk system 8 (which may include hard disk drives, floppy disk drives, and CD-ROM drives). It is therefore contemplated that system 2 of FIG. 1 corresponds to a conventional desktop computer or workstation, as are now common in the art. Of course, other system implementations of microprocessor 10 can also benefit from the present embodiments, as will be recognized by those of ordinary skill in the art.

Microprocessor 10 includes bus interface unit 12 that is connected to bus B, and which controls and effects communication between microprocessor 10 and the other elements in system 2. BIU 12 includes the appropriate control and clock circuitry to perform this function, including write buffers for increasing the speed of operation, and including timing circuitry so as to synchronize the results of internal microprocessor operation with bus B timing constraints. Microprocessor 10 also includes clock generation and control circuitry 20 which, in this exemplary microprocessor 10, generates internal clock phases based upon the bus clock from bus B; the frequency of the internal clock phases, in this example, may be selectably programmed as a multiple of the frequency of the bus clock.

As is evident in FIG. 1, microprocessor 10 has three levels of internal cache memory, with the highest of these as level 2 cache 14, which is connected to BIU 12. In this example, level 2 cache 14 is a unified cache, and is configured to receive all cacheable data and cacheable instructions from bus B via BIU 12, such that much of the bus traffic presented by microprocessor 10 is accomplished via level 2 cached 14. Of course, microprocessor 10 may also effect bus traffic around cache 14, by treating certain bus reads and writes as "not cacheable". Level 2 cache 14, as shown in FIG. 1, is connected to two level 1 caches 16; level 1 data cache $16_d$ is dedicated to data, while level 1 instruction cache $16_i$ is dedicated to instructions. Power consumption by microprocessor 10 is minimized by only accessing level 2 cache 14 only in the event of cache misses of the appropriate one of the level 1 caches 16. Furthermore, on the data side, microcache 18 is provided as a level 0 cache, and in this example is a fully dual-ported cache.

As shown in FIG. 1 and as noted hereinabove, microprocessor 10 is of the superscalar type. In this example multiple execution units are provided within microprocessor 10, allowing up to four instructions to be simultaneously executed in parallel for a single instruction pointer entry. These execution units include two ALUs $42_0$, $42_1$ for processing conditional branch, integer, and logical operations, floating-point unit (FPU) 30, two load-store units $40_0$, $40_1$, and microsequencer 48. The two load-store units 40 utilize the two ports to microcache 18, for true parallel access thereto, and also perform load and store operations to registers in register file 39. Data microtranslation lookaside buffer (μTLB) 38 is provided to translate logical data addresses into physical addresses, in the conventional manner.

These multiple execution units are controlled by way of multiple seven-stage pipeline. These stages are as follows:

F Fetch: This stage generates the instruction address and reads the instruction from the instruction cache or memory PD0 Predecode stage 0: This stage determines the length and starting position of up to three fetched x86-type instructions PD1 Predecode stage 1: This stage extracts the x86 instruction bytes and recodes them into fixed length format for decode DC Decode: This stage translates the x86 instructions into atomic operations (AOps)

SC Schedule: This stage assigns up to four AOps to the appropriate execution units OP Operand: This stage retrieves the register operands indicated by the AOps EX Execute: This stage runs the execution units according to the AOps and the retrieved operands WB Write back: This stage stores the results of the execution in registers or in memory Referring back to FIG. 1, the pipeline stages noted above are performed by various functional blocks within microprocessor 10. Fetch unit 26 generates instruction addresses from the instruction pointer, by way of instruction microtranslation lookaside buffer (μTLB) 22, which translates the logical instruction address to a physical address in the conventional way, for application to level 1 instruction cache $16_i$. Instruction cache $16_i$ produces a stream of instruction data to fetch unit 26, which in turn provides the instruction code to the predecode stages in the desired sequence. Speculative execution is primarily controlled by fetch unit 26, in a manner to be described in further detail hereinbelow.

Predecoding of the instructions is broken into two parts in microprocessor 10, namely predecode 0 stage 28 and predecode 1 stage 32. These two stages operate as separate pipeline stages, and together operate to locate up to three x86 instructions and apply the same to decoder 34. As such, the predecode stage of the pipeline in microprocessor 10 is three instructions wide. Predecode 0 unit 28, as noted above, determines the size and position of as many as three x86 instructions (which, of course, are variable length), and as such consists of three instruction recognizers; predecode 1 unit 32 recodes the multi-byte instructions into a fixed-length format, to facilitate decoding.

Decode unit 34, in this example, contains four instruction decoders, each capable of receiving a fixed length x86 instruction from predecode 1 unit 32 and producing from one to three atomic operations (AOps); AOps are substantially equivalent to RISC instructions. Three of the four decoders operate in parallel, placing up to nine AOps into the decode queue at the output of decode unit 34 to await scheduling; the fourth decoder is reserved for special cases. Scheduler 36 reads up to four AOps from the decode queue at the output of decode unit 34, and assigns these AOps to the appropriate execution units. In addition, the operand unit 44 receives and prepares the operands for execution, As indicated in FIG. 1, operand unit 44 receives an input from sequencer 44 and also from microcode ROM 46, via multiplexer 45, and fetches register operands for use in the execution of the instructions. In addition, according to this example, operand unit performs operand forwarding to send results to registers that are ready to be stored, and also performs address generation for AOps of the load and store type.

Microsequencer 48, in combination with microcode ROM 46, control ALUs 42 and load/store units 40 in the execution of microcode entry AOps, which are generally the last AOps to execute in a cycle. In this example, microsequencer 48 sequences through microinstructions stored in microcode ROM 46 to effect this control for those microcoded microinstructions. Examples of microcoded microinstructions include, for microprocessor 10, complex or rarely-used x86 instructions, x86 instructions that modify segment or control registers, handling of exceptions and interrupts, and multi-cycle instructions (such as REP instructions, and instructions that PUSH and POP all registers).

Microprocessor 10 also includes circuitry 24 for controlling the operation of JTAG scan testing, and of certain built-in self-test functions, ensuring the validity of the operation of microprocessor 10 upon completion of manufacturing, and upon resets and other events.

Figure 2A:
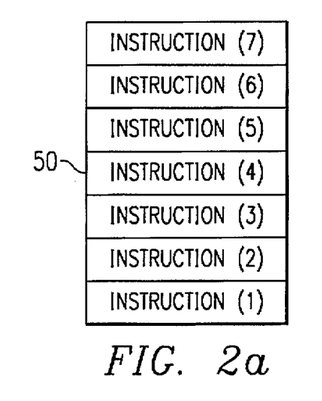
FIG. 2a illustrates an instruction pipeline including a group of sequentially ordered instructions.

To better appreciate the various embodiments described below, FIG. 2a illustrates diagrammatically a microprocessor pipeline designated generally at 50. Each entry in pipeline 50 corresponds to a different instruction, with it understood that each instruction is being processed at a different stage of the pipeline. For example, given the stages above, instruction 1 could be at the execution stage while instruction 7 is at the fetch stage. Further, each instruction within pipeline 50 has a corresponding number to indicate the sequential order in which the instructions appeared in the program prior to being placed into pipeline 50.

Figure 2B:
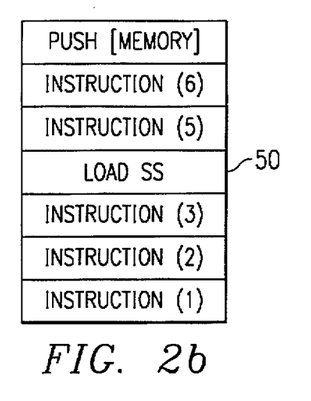
FIG. 2b illustrates the instruction pipeline of FIG. 2a with the particular example of a memory access instruction sequentially following an instruction operable to specify the memory access size.

Given the illustration of sequential instructions in FIG. 2a, FIG. 2b again shows those instructions, but includes particular instructions as certain entries within pipeline 50. The particular instructions in FIG. 2b are included to establish an example which is repeatedly referred to later in order to demonstrate how the embodiments below address the prior art drawbacks pertaining to instructions which access memory, but which are operable to access operands of variable sizes. Thus, for the following discussion, assume that instruction (4) (i.e., "LOAD SS") loads a value into the stack segment register, while instruction (7) (i.e., "PUSH [memory]") pushes information from memory onto the memory stack. Assume also that the remaining instructions, that is, instructions (1) through (3) and (5) through (6) are simply some other type of instruction in the sequence which does not affect the actions of instructions (4) and (7).

Given the example of FIG. 2b, note that the store by instruction (7) may depend on the result of instruction (4). Particularly, the LOAD SS instruction may change the value of the B bit within the stack descriptor stored within the SS register. If such a change occurs, when instruction (7) is thereafter executed, it must perform its store according to the newly changed value of the B bit. Particularly, if the B bit is a logic 0, then instruction (7) pushes a 16-bit operand to the memory stack, whereas if the B bit is a logic 1, then instruction (7) pushes a 32-bit operand to the memory stack. Thus, if instruction (4) changes the B bit from 0 to 1 (or vice versa), it specifies a change in the operand size of instruction (7). Assuming that instruction (4) changes the B bit, the prior art merely flushes pipeline 50 to discard all instructions following instruction (4). As described above, this operation causes the inefficiencies associated with pipeline flushes and the subsequent re-load of the pipeline. In contrast, the embodiments described below operate to prevent flushing of pipeline 50 if possible, or to delay the flush until intervening instructions which do not depend on the B bit finish (or D bit, if applicable), which in either event increases processor efficiency.

Figure 3:
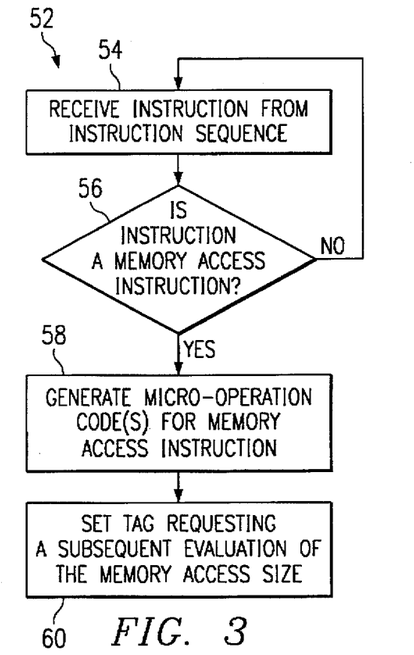
FIG. 3 illustrates a flowchart of a method embodiment for detecting a memory access instruction and tagging it for subsequent evaluation of the memory access size.

FIG. 3 illustrates a flowchart of a method designated generally at 52 and for improving memory access by instructions operable to access variable-sized operands. Step 54 receives into the processor pipeline an instruction from an instruction sequence arranged in a typical sequential fashion. Thus, from the example of FIG. 2b, step 54 first receives instruction (1). Note that the sequence arrangement is dictated by the order of the program code, but as known in the art, instruction fetching, decoding, execution, and other steps may be concurrent or even out of order. For example, several instructions (e.g., numbers (1) through (7) in FIG. 2b) actually may be fetched at once. As another example, in superscalar operation, certain instructions may be executed concurrently or even out of their sequence order. Step 54, therefore, merely intends to depict that instructions are somehow retrieved and then each is analyzed according to the following steps.

Step 56 determines whether the instruction received in step 54 is a memory access instruction, that is, an instruction which is operable to either read information from, or write information to, a memory system. Preferably, the determination of step 56 occurs during the pre-decode stage of operation. If the determination is negative, the flow returns to step 54 to analyze the next successive instruction. For example, step 56 will determine that instructions (1) through (6) of FIG. 2b are not memory access instructions and, therefore, the flow returns to step 54. Note that the return to step 54 is for purposes of the present embodiments, that is, for enhancing operations in connection with memory access instructions. Thus, in actuality, many other steps or methods may occur with respect to instructions which are not memory access instructions, but such methods need not be detailed here. Returning to step 56, if the determination of that step is positive, the flow continues to steps 58 and 60. For example, step 58 will determine that instruction (7) of FIG. 2b is a memory access instruction and, therefore, the flow continues to steps 58 and 60.

Step 58 generates at least one AOp corresponding to the received memory access instruction (e.g., instruction (7)). AOps are comparable to RISC instructions and, thus, are the codes which are connected to various portions of microprocessor 10 to subsequently initiate execution of the decoded instruction. Thus, AOps may be thought of as micro-operation codes, and are comparable to what is referred to in other architectures as ROps, MOps, or RISC86 instructions. Step 60 sets a tag associated with one or more of the AOps corresponding to the received memory access instruction. The tag includes information which, at a minimum, operates as a request for the size of the memory access to be evaluated at a time later than the decode. In other words, the final determination of the size of the memory access for purposes of executing the memory access instruction is delayed due to the tag. This is in stark contrast to the prior art. Particularly, the prior art evaluates the size of the memory access only at the time of the decode and the micro-operation codes resulting from the memory access instruction are created based on that size.

One skilled in the art should readily appreciate the benefits of the delayed request caused by the tag, such as in view of the example of FIG. 2b. Particularly, recall that instruction (7) should execute only given the correct value of the B bit created by instruction (4). However, if instruction (7) is decoded under the prior art at a time before instruction (4) has been able to correctly change the B bit, then instruction (7) is decoded based on the wrong value of the B bit and, therefore, will cause an erroneous memory access upon execution. Indeed, this potential of an erroneous memory access gives rise to the prior art technique of always flushing the pipeline when the B bit is changed. In other words, by flushing the pipeline and re-loading all successive instructions, the prior art prevents those successive instructions from executing until after the instruction which changes the B bit is finalized. As noted above, however, this absolute flush approach is highly inefficient.

Before proceeding with a discussion of the details of the tag information and response to that information, note that while steps 58 and 60 are shown sequentially in the flow of FIG. 3, it should be understood that a particular tag and AOp may be generated in a single instance, where a portion of the AOp includes the tag information rather than first generating an AOp and then next generating the tag. Note further that by "setting" the tag it is intended to suggest that either additional information is added to an AOp or, in the alternative, that bits are already included in the AOp but are placed in a particular state to represent the tag information.

Figure 4:
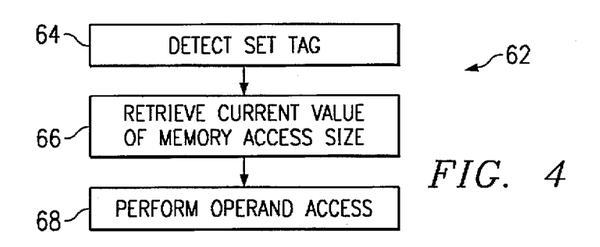
FIG. 4 illustrates a flowchart of a method embodiment for responding to the instruction tag by using a more current value of the memory access size.

FIG. 4 illustrates a flowchart of a method embodiment designated generally at 62, and which may follow the steps of method 52 of FIG. 3. Turning then to FIG. 4, step 64 detects the tag set in step 60 which, recall, requests a subsequent evaluation of the memory access size. In response to this request, step 66 retrieves the then-current value of the memory access size. Thus, in the example of FIG. 2b, step 66 would retrieve the current value of the B bit as established by any previously graduated instruction which affects the B bit, such as the LOAD SS of instruction (4). Preferably, this retrieval occurs immediately before the action of step 68 and, therefore, a delay has occurred to potentially allow instruction (4) to graduate. Indeed, recall from the above discussion of FIG. 1 that in the preferred embodiment the schedule stage follows the decode stage; therefore, step 66 may be scheduled to wait until it is as assured that instruction (4) has graduated, thereby ensuring an accurate B bit before step 66 retrieves the B bit for instruction (7). Next, step 68 performs the operand stage of operation in accordance with the newly-retrieved value of the memory access size. Given the steps of FIG. 4 and the example of FIG. 2b, one skilled in the art will appreciate that instruction (7) acts on the accurate B bit because the B bit is retrieved only immediately before the operand stage of instruction (7) occurs. Thus, instruction (7) is permitted to ultimately execute and graduate without a flushing of the pipeline immediately after instruction (4). Accordingly, there is an increased performance benefit over the prior art.

Note that in certain instances the embodiment of FIG. 4 may not be preferable. For example, in certain architectures, an instruction with an immediate operand (e.g., PUSH [immediate]) requires the correct value of the B bit in order for the pre-decode stage(s) to correctly parse the instruction. Thus, in such an architecture, it is not acceptable to delay obtaining the value of the B bit as is achieved by method 62 of FIG. 4. As such, method 62 of FIG. 4 is preferably imposed in these architectures only for operands written to memory which are non-immediate operands. However, the embodiment of FIG. 3 also may be combined with that shown in FIG. 5 below, and the resulting combination will improve operation even in the instances of immediate operands instructions.

Figure 5:
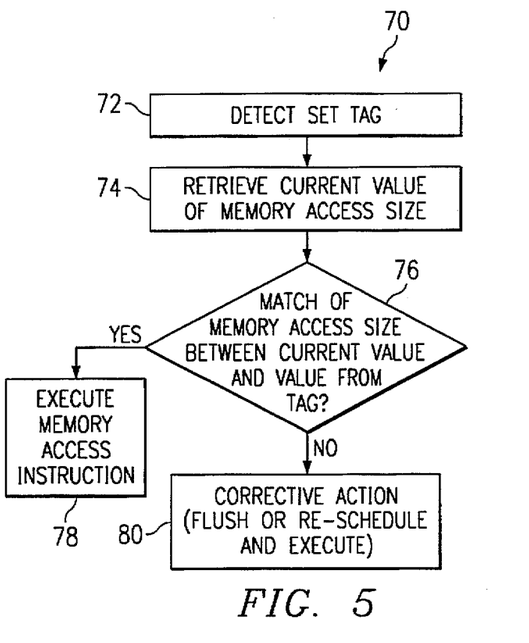
FIG. 5 illustrates a flowchart of a method embodiment for taking corrective action if the memory access size at the time the tag is set is inaccurate.

FIG. 5 illustrates a flowchart of a method embodiment designated generally at 70, and which also may follow the steps of method 52 of FIG. 3. Turning then to FIG. 5, step 72 detects the tag set in step 60 and, therefore, again detects a request to subsequently evaluate the memory access size. When it is desirable to combine the methods of FIGS. 3 and 5, note that the tag from step 60 further includes the value of the memory access size (e.g., the value of the B bit) as of the time that the tag was set. From this, method 70 continues to step 74 which retrieves the value of the memory access size as of the time of this retrieval step. Next, step 76 compares the value of the memory access size as of the time of retrieval step 74 with the value of the memory access size as of the time the tag was set in step 60. If the values match, the flow continues to step 78, whereas if the values do not match, the flow continues to step 80.

In step 78, having determined in step 76 that the values of the memory access of the tag setting time and as of some later retrieval time match, the memory access instruction is permitted to complete. Particularly, having made this determination, it is now known that the memory access value as of the decode time (i.e., the time at which the tag was set) was indeed a correct value and was not thereafter changed. Returning to the example of FIG. 2b, therefore, instruction (7) is permitted to complete all stages and graduate.

In step 80, having determined in step 76 that the value of the memory access of the tag setting time and as of some later retrieval time do not match, then a corrective action is required so that the memory access instruction at issue does not execute given an incorrect memory access size. In a first alternative, therefore, the corrective action is to flush the pipeline, starting with the memory access instruction and any instruction thereafter which is in the pipeline. Note that this alternative still has benefits over the prior art. For example, returning to FIG. 2b, recall that the prior art would flush instructions (5) through (7) if instruction (4) changed the memory access size. In contrast, the above described embodiment, having taken the corrective flush action of step 80, still permits instructions (5) and (6) to execute and graduate. Accordingly, even though the pipeline is ultimately flushed, there is still a performance increase because additional instructions are permitted to complete prior to the flush. Moreover, in a second alternative, the corrective action of step 80 is to once more retrieve the then-current value of the memory access size and to re-schedule the memory access instruction using this most recent value of the memory access size. Again, such an approach may not be acceptable for immediate operand instructions under certain architectures, but is still preferable in those situations where such an approach permits instruction execution without having to flush the pipeline due to a change in the memory access size.

The above embodiments have been described in connection with memory access instructions, where those instructions access either stack or data memory. Further, the example of FIG. 2b relates particularly to stack memory. With respect to stack memory, the use of a portion of memory as a logical "stack" is well known in the art. A conventional stack is implemented as a group of multiple memory locations that are dealt with in a last-in-first-out manner, where the contents of a register, commonly referred to as the stack pointer, contain the current address of the "top" of the stack. The stack will be defined by the architecture of the microprocessor; for example, the stack in x86-architecture microprocessors is that portion of memory in the SS segment to which the SP register points. Other architectures, such as the IBM 360 architecture, may not use a stack (i.e., a portion of memory) but may instead use a register that is identified by an operand in the return instruction, to store the return address in a similar fashion as a stack. Those architectures having stacks also generally respond to simple instructions, such as PUSH and POP, to store data to and load data from the stack, respectively, modifying the stack pointer accordingly in either case. The stack of a microprocessor is often used in connection with subroutine calls, as it provides a convenient conduit for the passing of parameters back and forth between a calling program and a subroutine. In addition, as noted above, subroutine calls also generally PUSH the return address onto the stack, during their execution. With respect to data memory, this include areas of memory into which operands other than stack accesses are implemented. Given the two types of memory areas, note that certain of the above embodiments are preferably implemented only in the instance of stack memory access instructions and not data memory access instructions. Given these considerations, however, it is contemplated that a person skilled in the art could readily weigh the benefits of the above against any potential drawbacks, and appropriately determine the applicability to either or both of stack and data memory instructions.

Note also that the methods described above may be performed using various known circuit techniques. For example, instruction fetching is accomplished in fetch unit 26. As another example, the decode operations could be included in decoder 34, and a copy of the B bit or D bit may be obtained from register file 39 and stored in any one of many known storage devices. The comparing and detecting steps also may be accomplished using any type of comparator circuit. Scheduling may be incorporated into scheduler 36, and flushing may be accomplished by enabling any existing flushing hardware, such as an exceptions controller which is already established to flush one or more pipelines in response to one or more events.

In all events, from the above it may be appreciated that the present embodiments provide great flexibility over the prior art when pipelining memory access instructions, particularly given the need to reconcile those instructions with other pipelined instructions operable to specify the size of the memory access. In certain embodiments, the memory access instruction is notified of the memory access size after decode and, therefore, the chance of an erroneous access size is reduced. In another embodiment, a pipeline flush may occur in the instance of the determination of a wrongly informed memory access instruction, but other instructions sequentially arranged between the memory access instruction and the instruction operable to specify the memory access size are permitted to execute. In still another embodiment, a correction and rescheduling occurs in the instance of the determination of a wrongly informed memory access instruction. These many alternatives, as well as the reduced instances of pipeline flushes and wasted clock cycles, all demonstrate the flexibility of the above. Further, while the present embodiments have been described in detail, various substitutions, modifications or alterations could be made to the descriptions set forth above without departing from the inventive scope which is defined by the following claims.

What is claimed is:

1. A method of operating a processor to process a plurality of sequentially arranged instructions, said method comprising the steps of:

receiving into a processor pipeline an instruction from the plurality of sequentially arranged instructions;

determining whether the received instruction comprises a memory access instruction, the memory access instruction operable to access memory information of a specifiable size;

in response to determining that the received instruction comprises a memory access instruction, the steps of:
generating at least one micro-operation code corresponding to the memory access instruction; and
setting a tag to the at least one micro-operation code, the set tag requesting a subsequent evaluation of the specifiable size; and after said setting step, the steps of:
detecting the set tag; and
in response to the set tag, retrieving a current value of the specifiable size.

2. The method of claim 1 wherein the memory access instruction comprises a stack memory access instruction.

3. The method of claim 1 wherein the memory access instruction comprises a data memory access instruction.

4. The method of claim 1 wherein the memory access instruction comprises an instruction for writing an operand to a memory, wherein the operand comprises a non-immediate operand.

5. The method of claim 1 and further comprising the step of accessing the memory information according to the current value of the specifiable size.

6. The method of claim 5 and further comprising, prior to said retrieving step, the steps of:
receiving into the processor pipeline a memory access size instruction, the memory access size instruction for specifying the current value of the specifiable size;
graduating the memory access size instruction.

7. The method of claim 5 wherein the memory access instruction comprises an instruction for writing an operand to a memory, wherein the operand comprises a non-immediate operand.

8. The method of claim 1 wherein said step of setting the tag comprises setting the tag to comprise the specifiable size as of the time of said setting step.

9. The method of claim 8 and further comprising the step of comparing the specifiable size as of the time of said setting step with the current value of the specifiable size of the memory information.

10. The method of claim 9 and further comprising the step of, in response to determining that the specifiable size as of the time of said setting step matches the current value of the specifiable size of the memory information, accessing the memory information according to the specifiable size as of the time of said setting step.

11. The method of claim 9 and further comprising the steps of:
receiving into the processor pipeline a first group of instructions of the plurality of sequentially arranged instructions, wherein each first group instruction is sequentially arranged after the memory access instruction; and
in response to determining that the specifiable size as of the time of said setting step does not match the current value of the specifiable size of the memory information, the step of flushing from the processor pipeline the first group of instructions.

12. The method of claim 11 and further comprising the step of determining whether the received instruction comprises an instruction for writing an operand to a memory, wherein the operand comprises an immediate operand.

13. The method of claim 9 wherein said current value comprises a first current value, and further comprising the steps of:
in response to determining that the specifiable size as of the time of said setting step does not match the current value of the specifiable size of the memory information, the steps of:
retrieving a second current value of the specifiable size of the memory information; and
accessing the memory information according to the second current value of the specifiable size.

14. The method of claim 13 and further comprising, prior to said step of retrieving a second current value of the specifiable size, the steps of:
receiving into the processor pipeline a memory access size instruction, the memory access size instruction for specifying the second current value of the specifiable size; and
graduating the memory access size instruction.

15. The method of claim 13 and further comprising the step of determining whether the received instruction comprises an instruction for writing an operand to a memory, wherein the operand comprises an immediate operand.

16. A processor for processing a plurality of sequentially arranged instructions, comprising:
a processor pipeline for receiving an instruction from the plurality of sequentially arranged instructions;
circuitry for determining whether the received instruction comprises a memory access instruction, the memory access instruction operable to access memory information of a specifiable size;
in response to determining that the received instruction comprises a memory access instruction:
circuitry for generating at least one micro-operation code corresponding to the received instruction; and
circuitry for setting a tag to the at least one micro-operation code, the set tag requesting a subsequent evaluation of the specifiable size;
circuitry for detecting the set tag; and
in response to said circuitry for detecting the set tag, circuitry for retrieving a current value of the specifiable size.

17. The processor of claim 16 wherein the memory access instruction comprises a stack memory access instruction.

18. The processor of claim 16 wherein the memory access instruction comprises a data memory access instruction.

19. The processor of claim 16 wherein the memory access instruction comprises an instruction for writing an operand to a memory, wherein the operand comprises a non-immediate operand.

20. The processor of claim 16 and further comprising circuitry for accessing the memory information according to the current value of the specifiable size.

21. The processor of claim 20 and further comprising:
circuitry for receiving into the processor pipeline a memory access size instruction, the memory access size instruction for specifying the current value of the specifiable size; and
circuitry for graduating the memory access size instruction, wherein said circuitry for accessing operates after sized circuitry for graduating.

22. The processor of claim 20 wherein the memory access instruction comprises an instruction for writing an operand to a memory, wherein the operand comprises a non-immediate operand.

23. The processor of claim 16 wherein said circuitry for setting the tag comprises circuitry for setting the tag to comprise the specifiable size as of the time of operation of said circuitry for setting.

24. The processor of claim 23 and further comprising circuitry for comparing the specifiable size from said circuitry for setting with the current value of the specifiable size of the memory information.

25. The processor of claim 24 and further comprising, in response to said circuitry for comparing determining that the specifiable size from said circuitry for setting matches the current value of the specifiable size of the memory information, circuitry for accessing the memory information according to the specifiable size from said circuitry for setting.

26. The processor of claim 24 and further comprising:
circuitry for receiving into the processor pipeline a first group of instructions of the plurality of sequentially arranged instructions, wherein each first group instruction is sequentially arranged after the memory access instruction; and
circuitry for, in response to said circuitry for comparing determining that the specifiable size from said circuitry for setting does not match the current value of the specifiable size of the memory information, flushing from the processor pipeline the first group of instructions.

27. The processor of claim 26 and further comprising circuitry for determining whether the received instruction comprises an instruction for writing an operand to a memory, wherein the operand comprises an immediate operand.

28. The processor of claim 24 wherein said current value comprises a first current value, and further comprising:
in response to said circuitry for comparing determining that the specifiable size from said circuitry for setting does not match the current value of the specifiable size of the memory information:
circuitry for retrieving a second current value of the specifiable size of the memory information; and
circuitry for accessing the memory information according to the second current value of the specifiable size.

29. The processor of claim 28 and further comprising:
circuitry for receiving into the processor pipeline a memory access size instruction, the memory access size instruction for specifying the second current value of the specifiable size; and
circuitry for graduating the memory access size instruction, wherein said circuitry for accessing the memory information according to the second current value of the specifiable size operates after said circuitry for graduating.

30. The processor of claim 28 and further comprising circuitry for determining whether the received instruction comprises an instruction for writing an operand to a memory, wherein the operand comprises an immediate operand.

31. A microprocessor-based computer system, comprising:
an input device;
a display system;
a main memory; and
a microprocessor, coupled to the input device, display system and main memory, and for processing a plurality of sequentially arranged instructions, said microprocessor comprising:
a processor pipeline for receiving an instruction from the plurality of sequentially arranged instructions;
circuitry for determining whether the received instruction comprises a memory access instruction, the memory access instruction operable to access memory information of a specifiable size;
in response to determining that the received instruction comprises a memory access instruction:
circuitry for generating at least one micro-operation code corresponding to the received instruction; and
circuitry for setting a tag to the at least one micro-operation code, the set tag requesting a subsequent evaluation of the specifiable size;
circuitry for detecting the set tag; and
in response to said circuitry for detecting the set tag, circuitry for retrieving a current value of the specifiable size.

32. The system of claim 31 wherein the memory access instruction comprises a stack memory access instruction.

33. The system of claim 31 wherein the memory access instruction comprises a data memory access instruction.

34. The system of claim 31 wherein the memory access instruction comprises an instruction for writing an operand to a memory, wherein the operand comprises a non-immediate operand.

35. The system of claim 31 and further comprising circuitry for accessing the memory information according to the current value of the specifiable size.

36. The system of claim 35 and further comprising:
circuitry for receiving into the processor pipeline a memory access size instruction, the memory access size instruction for specifying the current value of the specifiable size; and
circuitry for graduating the memory access size instruction, wherein said circuitry for accessing operates after sized circuitry for graduating.

37. The system of claim 31 wherein said circuitry for setting the tag comprises circuitry for setting the tag to comprise the specifiable size as of the time of operation of said circuitry for setting.

38. The system of claim 37 and further comprising circuitry for comparing the specifiable size from said circuitry for setting with the current value of the specifiable size of the memory information.

39. The system of claim 38 and further comprising, in response to said circuitry for comparing determining that the specifiable size from said circuitry for setting matches the current value of the specifiable size of the memory information, circuitry for accessing the memory information according to the specifiable size from said circuitry for setting.

40. The system of claim 38 and further comprising:
circuitry for receiving into the processor pipeline a first group of instructions of the plurality of sequentially arranged instructions, wherein each first group instruction is sequentially arranged after the memory access instruction; and
circuitry for, in response to said circuitry for comparing determining that the specifiable size from said circuitry for setting does not match the current value of the specifiable size of the memory information, flushing from the processor pipeline the first group of instructions.

41. The system of claim 38 wherein said current value comprises a first current value, and further comprising:
in response to said circuitry for comparing determining that the specifiable size from said circuitry for setting does not match the current value of the specifiable size of the memory information:

circuitry for retrieving a second current value of the specifiable size of the memory information; and circuitry for accessing the memory information according to the second current value of the specifiable size.

42. The system of claim 41 and further comprising:

circuitry for receiving into the processor pipeline a memory access size instruction, the memory access size instruction for specifying the second current value of the specifiable size; and circuitry for graduating the memory access size instruction, wherein said circuitry for accessing the memory information according to the second current value of the specifiable size operates after said circuitry for graduating.

* * * * *